J. RENNER.
HOLDER FOR ICE CREAM CONES.
APPLICATION FILED JULY 24, 1912.
1,044,911.
Patented Nov. 19, 1912.
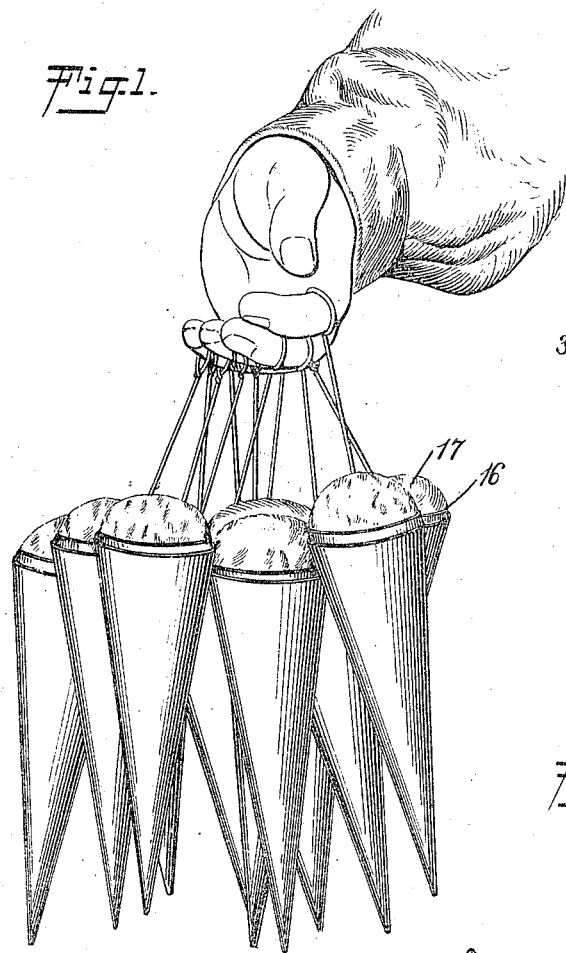
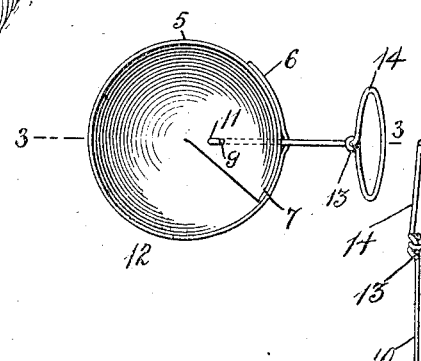
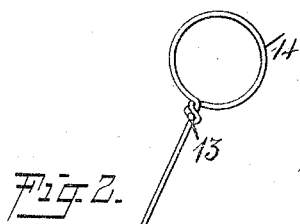
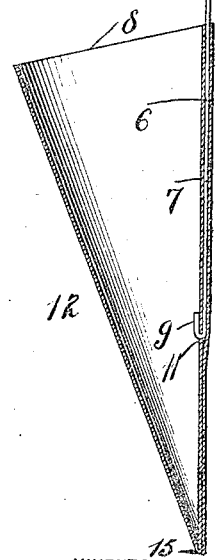
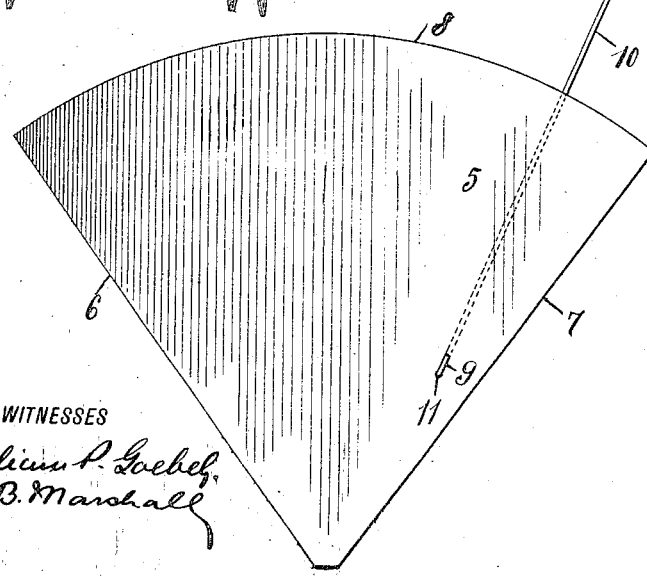
WITNESSES
William P. Goebel,
E. B. Marshall
INVENTOR
Jacob Renner
BY Munn & Co
ATTORNEYS

UNITED STATES PATENT OFFICE.

JACOB RENNER, OF ROCKWELL CITY, IOWA.

HOLDER FOR ICE-CREAM CONES.

1,044,911.

Specification of Letters Patent. Patented Nov. 19, 1912.

Application filed July 24, 1912. Serial No. 711,328.

*To all whom it may concern:*

Be it known that I, JACOB RENNER, a citizen of the United States, and a resident of Rockwell City, in the county of Calhoun and State of Iowa, have invented a new and Improved Holder for Ice-Cream Cones, of which the following is a full, clear, and exact description.

The object of my invention is to provide a holder for ice cream cones, which may be manufactured at little expense, and which makes it possible for one person to carry and distribute a great number of ice cream cones at one time, without it being necessary for him to touch the ice cream cones, or soil them in any way. In this way the ice cream cones may be carried about by any person without danger of their becoming soiled or dirty.

Additional objects of my invention will appear in the following complete specification, in which the preferred form of the invention is disclosed.

In the drawings similar characters of reference indicate corresponding parts in all the views, in which—.

Figure 1 is a perspective view showing how a person may carry a number of ice cream cones with my holder in a convenient manner; Fig. 2 is a plan view showing one of the ice cream cone holders before it is turned, and its sides are secured together; Fig. 3 is a sectional view on the line 3—3 of Fig. 4; and Fig. 4 is a plan view of Fig. 3.

By referring to the drawings it will be seen that a triangular member 5 preferably of paper, is provided, having straight sides 6 and 7, a curved side 8, this curved side 8 forming the top of the holder when the member 5 is bent in the shape of a cone, as shown in Figs. 3 and 4. Before bending the member 5 in the shape of a cone, a hook 9 on the wire member 10 is inserted in the orifice 11, in the member 5, this orifice 11 being disposed near the side 7 of the member 5. It will be seen by referring to Fig. 3 of the drawings, that the wire member 10 is disposed against the outer side of the member 5, when the member 5 is bent to form a cone 12, shown in Figs. 3 and 4, of the drawings. When the member 5 is bent to form the cone, and the side 6 overlaps the side 7, it also extends against the wire member 10, so that this wire member 10 will be held between the sides 6 and 7 of the triangular member 5; when these sides 6 and 7 are then glued together, to form the cone or cup-shaped member 12, the wire member 10 will be held therebetween. The upper terminal 13 of the wire member 10 is bent to form a loop 14, which may be slipped on the finger, so that the holder may be conveniently carried. The bottoms 15 of these cones 12 are secured together with glue or paste, so that there is no danger of leaking. When the holder is thus constructed, the cones 16 shown in Fig. 1 of the drawings are filled with ice cream, or other similar material 17, and are deposited in the cone holders 12, by which means they may be conveniently carried about, and be distributed without in any way soiling the cones 16.

Having thus described my invention, I claim as new and desire to secure by Letters Patent:—

1. In an article of the class described, a member bent to form an inverted cone with its sides overlapping, a supporting member disposed between the sides and extending upwardly from the inverted cone, and means for securing the sides together and to the supporting member.

2. In an article of the class described, a member bent to form an inverted cone with its sides overlapping, a supporting member supported between the sides and extending upwardly on the inverted cone, means for securing the sides together and to the supporting member, the supporting member being bent at its free terminal, by which means the cone may be carried.

3. In an article of the class described, a member bent to form a cup-shaped member with its sides overlapping, there being an orifice in the member, a wire with a hook extending through the orifice in the member from the outer side, the wire being disposed between the overlapping sides, and means for securing the sides together and to the wire.

4. In an article of the class described, a member bent to form a cup-shaped member with its sides overlapping, there being an orifice in the member, a wire with a hook extending through the orifice in the member from the outer side, the wire being disposed between the overlapping sides, and means for securing the sides together and to the wire, the upper terminal of the wire being bent to form a loop by which means the article may be carried about.

In testimony whereof I have signed my name to this specification in the presence of two subscribing witnesses.

JACOB RENNER.

Witnesses:
N. A. SANDBURY,
EARL W. BEERMAN.